United States Patent [19]

Lee et al.

[11] 3,949,321
[45] Apr. 6, 1976

[54] CONICAL NOZZLE AERODYNAMIC WINDOW

[75] Inventors: Ronald E. Lee, Beltsville; Robert Voisinet, Silver Spring, both of Md.

[73] Assignee: The United States of America as represented by the Secretary of the Navy, Washington, D.C.

[22] Filed: Dec. 26, 1974

[21] Appl. No.: 536,507

[52] U.S. Cl.......... 331/94.5 D; 331/94.5 G; 330/4.3
[51] Int. Cl.²........................................... H01S 3/22
[58] Field of Search.................... 331/94.5; 330/4.3; 350/319

[56] References Cited
UNITED STATES PATENTS

| 3,768,035 | 10/1973 | Zar .............................. 331/94.5 D |
| 3,836,237 | 9/1974 | Egan et al.......................... 350/319 |
| 3,851,273 | 11/1974 | Hoag et al. ..................... 331/94.5 D |

*Primary Examiner*—Robert J. Webster
*Attorney, Agent, or Firm*—R. S. Sciascia; J. A. Cooke; F. K. Yee

[57] ABSTRACT

An aerodynamic window for isolating different gases or different states of gases when typical transparent window material is not feasible. An adjustable, supersonic conical nozzle is mounted coaxially with an opening and a cylindrical tube is mounted to the opening and extends coaxially toward the conical nozzle. A sliding-wedge-type gate valve is used to close the tube. The start up procedure consists of adjusting the conical nozzle axially to equalize the pressure on both sides of the wedge valve. Once the pressure is equalized the wedge may be removed.

13 Claims, 2 Drawing Figures

3,949,321

CONICAL NOZZLE AERODYNAMIC WINDOW

BACKGROUND OF THE INVENTION

The invention relates to aerodynamic windows and more particularly to an adjustable-pressure aerodynamic window employing a conical supersonic nozzle.

The aerodynamic window is simply an opening between two regions or different gases, gases at different pressures, or different states of gases where the gas in each region is isolated from the other by aerodynamic means. An example of such a configuration can be a gasdynamic laser test cavity inside a laboratory room with the room being one region and the gas dynamic laser test cavity the other. The gas flow inside the gasdynamic laser test cavity will produce a lower pressure than the room and consequently air will be drawn from the room through any opening between the room and test cavity. To prevent this leakage, aerodynamic means may be employed to balance the pressures across the opening, thus forming an aerodynamic window.

The need for such a device exists when ordinary transparent window material such as plate glass, quartz or plexiglass interferes with the test requirements. For example, the test requirement associated with the previously discussed gasdynamic laser application would be the high energy transmittance of $10.6\mu$ laser beam. Beam attenuation and high thermal loading would limit the use of any conventional transparent substance in lasers of high power densities. Absorption of even a small fraction of the incident laser radiation can cause a temperature gradient in the window which results in thickness variations due to thermal expansion and refractive index gradients and stresses, which in turn distort the optical beam. This can occur at power levels well below those required to melt or fracture the window.

It should be noted that although the application of an aerodynamic window will be discussed primarily in its use with gas-dynamic lasers, other applications in aerodynamic facilities are numerous. For example, the injection of models into a wind tunnel test section could be attained through an aerodynamic window separating the different pressure regions in the test section and outside the tunnel.

An aerodynamic window employs a flowing gas to create a pressure differential which is used to match the laser cavity pressure to atmospheric pressure. Aerodynamic windows may be of two types, those that run from vacuum and those that run from a high pressure gas supply. In general, vacuum windows require a smaller mass flow. However, since a high pressure supply of gas is usually available at high-power laser sites, the pressure aerodynamic windows are more generally employed.

Examples of pressure-driven aerodynamic windows are those described in U.S. Pat. Nos. 3,604,789, 3,617,928 and 3,654,569. In U.S. Pat. No. 3,604,789, issued Sept. 14, 1971 to McLafferty, gas is expanded from atmospheric pressure in a supersonic nozzle where a Prandtl-Meyer expansion flow on one side of the nozzle throat lowers the pressure to that of the cavity. The laser beam passes through the nozzle entrance and an opening on the nozzle wall. In a variation of this design, Haussman, in U.S. Pat. No. 3,617,928, issued Nov. 2, 1971, expands the gas from high pressure to less than an atmosphere and then incorporates the Prandtl-Meyer expansion flow to lower the pressure on the opposite side of the nozzle wall to the cavity pressure. This idea requires a lower mass flow rate. In U.S. Pat. No. 3,654,569, issued Apr. 4, 1972 to Haussmann, gas at supersonic speed flows past a wedge, or isentropic compression surface, to establish a series of oblique shock waves, with the pressure upstream being matched to the cavity pressure and that downstream being equal to the atmospheric pressure.

In these example aerodynamic windows, the contoured nozzles and flow passage are of complicated designs which are expensive to produce and involve precise curvatures to yield the necessary pressure conditions. Each laser cavity must have a specially-designed nozzle and flow passage. Changes in the cavity static pressure resulting from, for example, changes in the gas composition, cannot be readily accommodated and necessitate a totally different aerodynamic window. In addition to these shortcomings, the system of McLafferty (U.S. Pat. No. 3,604,789) involves a gas flow that is off-axis from the laser output, resulting in a highly distorted beam as it passes through the pressure gradients.

The conical nozzle aerodynamic window disclosed herein overcomes these and other disadvantages of existing device by utilizing the stagnation pressure drop across a normal shock wave. An axisymmetric nozzle creates a high-Mach-number flow such that the recovery pressure after the normal shock is equal to the cavity pressure. The output beam is normal to all density gradients which minimizes optical distortion. Furthermore, a contoured nozzle is not required and pressure ratios can be easily adjusted.

SUMMARY OF THE INVENTION

Accordingly it is an object of the invention to provide an improved aerodynamic window to control pressure differentials with gas flows.

Another object of the invention is to provide an improved aerodynamic window that is simple in design and economical of fabrication.

A further object of the invention is to provide an improved aerodynamic window that introduces minimal distortion to the output signal.

Yet another object of the invention is to provide an improved aerodynamic window having an easily-controlled, adjustable pressure range.

These and other objects of the present invention are achieved in an aerodynamic window having a supersonic, conical nozzle mounted with its axis normal to the plane of a cavity opening. A cylindrical tube mounted to the opening extends coaxially toward the nozzle and supports a sliding wedge valve for the initial blocking of the flow inside the tube. In operation the axial position of the nozzle is adjusted to equalize the pressure on both sides of the wedge valve. Once the pressure is equalized the wedge is removed to form the aerodynamic window.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings.

DESCRIPTION OF THE PREFERRED EMBODIMENT

Figure 1:
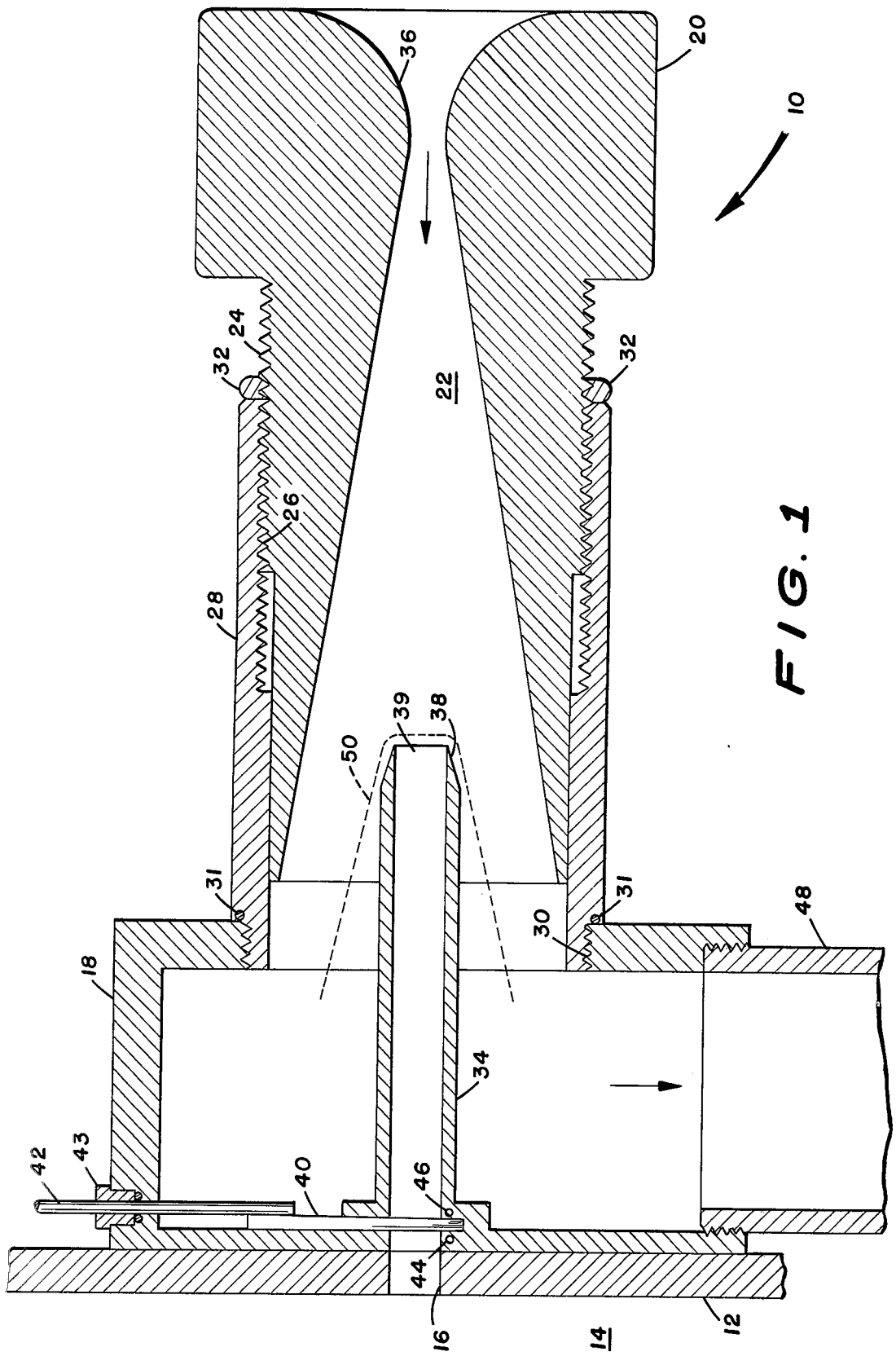
FIG. 1 is a section view of the aerodynamic window.

Referring now to the drawings, wherein like reference numeral designate like or corresponding parts throughout the several views, there is shown in FIG. 1 an embodiment of the aerodynamic window 10 of the present invention attached to the wall 12 of a chamber 14, such as a laser chamber or cavity. An aperture 16 is provided in the wall 12 for passage of the laser beam.

Attached to the exterior surface of wall 12 by means of a connecting chamber 18 is an axisymmetric, conical nozzle 20 having its centerline coaxial with the centerline of aperture 16. The exterior surface of the expansion section 22 of nozzle 20 is provided with threaded means 24 which mates with the internal threads 26 on a tubular extension 28 suitably attached to chamber 18, as by screw threads 30. An annular, flexible ring 31 provides a fluid seal at this attachment point. A locking nut 32 is adjustably positioned on the expansion section 22 to bear against the end of extension 28 to securely fasten nozzle 20 against longitudinal movement.

Positioned coaxially with and attached adjacent to aperture 16 is a cylindrical tube 34 having an inner diameter substantially equal to the diameter of the aperture. Tube 34 extends toward the throat 36 of nozzle 20 and is provided with an externally-tapered nose section forming a sharp, beveled leading edge 38 around the mouth 39. Approximate to the end of tube 34 attached to the wall 12 is a lateral opening which slidably receives a tapered-wedge-type valve 40 extending across the inner diameter of the tube to provide a closure means for the aperture 16. A slidable control rod 42 is secured to one end of the valve 40 and extends out from the chamber 18 through a pressure seal 43 to permit adjustment of the valve. Pressure sensing means 44 and 46 are positioned in the wall of tube 34 on both sides of valve 40 to measure the pressure in the tube adjacent to cavity 14 and upstream of the valve 40, respectively. An exhaust conduit 48 is connected at one end of chamber 18 to lead the gas flow from the chamber.

In operation, the free end, or mouth, of nozzle 20 is exposed to ambient air, and a gas flow, as indicated by the arrows, is established through the nozzle by suitable means, such as a pump drawing air through the exhaust conduit 48. Wedge valve 40 is closed to shut off flow in tube 34. Nozzle 20 expands the flow supersonically, the flow producing a normal shock wave 50 as it passes the sharp, beveled, edge 38 of the mouth 39 of the tube. Pressure will decrease as the flow approaches the mouth of the tube 34, with the stagnation pressure dropping sharply across the normal shock wave 50. In this condition, and with the valve 40 closed, tube 34 is like a conventional Pitot probe in a supersonic stream. The stagnation pressure in the tube, as measured by the sensor 46, is adjusted to equalize the cavity pressure, as measured by sensor 44, by loosening the lock nut 32 and rotating the nozzle 20 inwardly or outwardly relative to the tubular extension 28 to adjust the distance between the nozzle throat 36 and the mouth of tube 34. Once the pressures are equalized, nut 32 is tightened and valve 40 is open to permit passage of the laser beam through the aperture 16 and tube 34.

Figure 2:
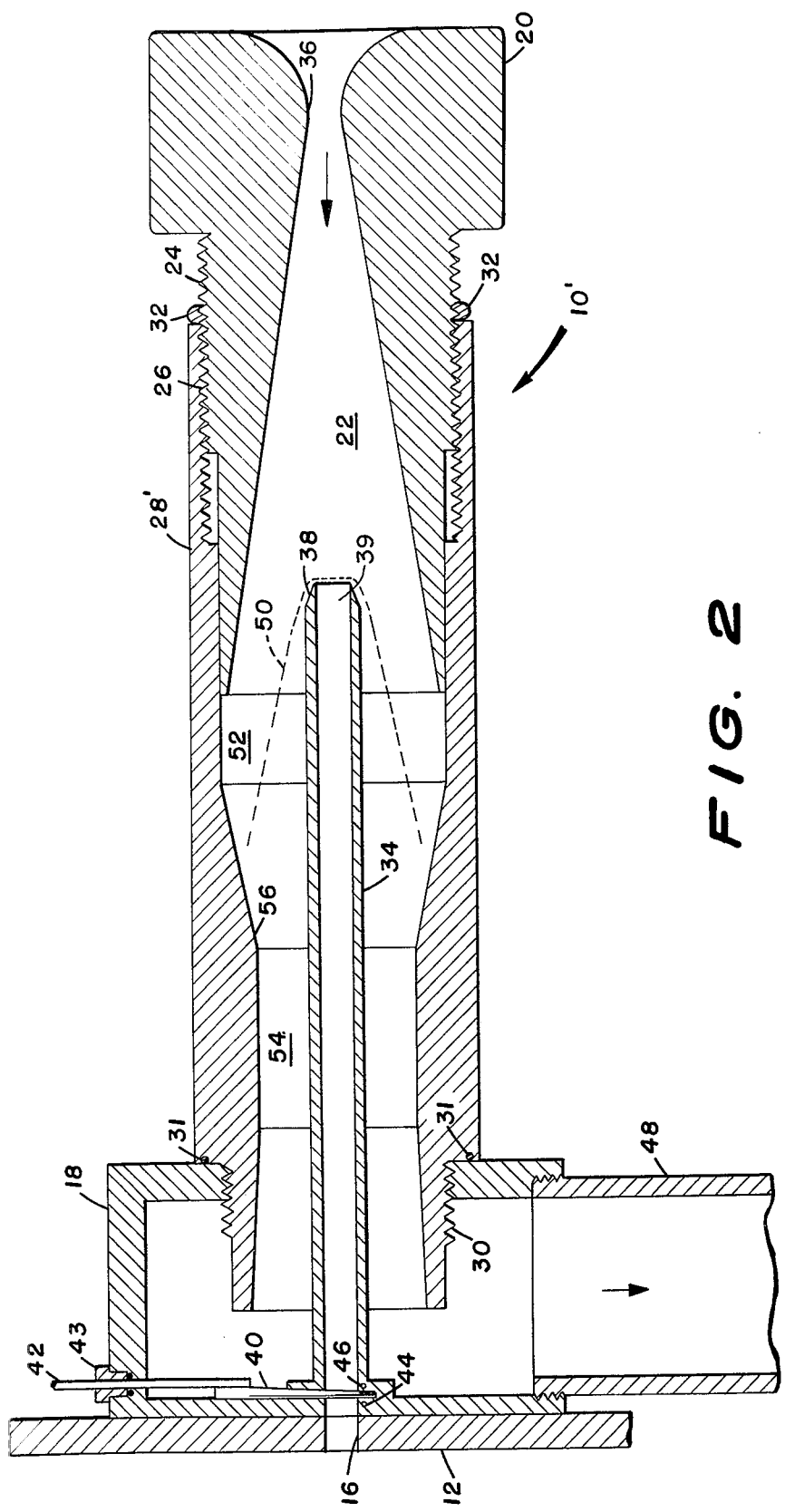
FIG. 2 is an alternative embodiment.

Since the nozzle flow in FIG. 1 exhausts off-axis, it may be desirable to attach a supersonic-subsonic diffuser to maintain flow symmetry about the tube 34, as shown in the embodiment of FIG. 2. The aerodynamic window 10' of FIG. 2 is structurally and operationally similar to that of FIG. 1, except that the tubular extension 28' connected to the chamber 18 is elongated to incorporate a diffuser section 52 and a shock duct 54 downstream of the tube mouth 39. The tube 34, of course, is also accordingly elongated. A predetermined distance aft of the mouth 39, the inside surface of extension 28 converges to form the diffuser throat 56, and then continues to form the substantially constant-diameter shock duct 54, terminating in the connecting chamber 18 to permit the flow to then turn and exhaust out through conduit 48. In addition to maintaining flow symmetry, the supersonic-subsonic diffuser effects a flow pressure recovery in the diffuser to reduce the energy requirement in establishing flow through the nozzle.

It is understood, of course, that the necessary critical dimensions, such as nozzle throat area, area ratio between the nozzle throat and tube, nozzle expansion angle, distance between the nozzle throat and the tube mouth, and the diffuser dimensions, will be properly selected to suit the requirements by methods known to those skilled in the art.

The advantages of the present invention can be readily seen from the foregoing description. Among other features, the simplicity of design resulting from the use of a simple conical nozzle in contrast to the contoured nozzles necessary for many existing configurations considerably reduces the cost of nozzle fabrication. Secondly, beam distortion in a gasdynamic laser is a function of the density gradient superimposed on the beam in traversing the aerodynamic window. Of particular concern are density gradients normal to the direction of beam propagation whereas density gradients in the direction of beam propagation have little effect on the beam quality. For this reason, the present design is advantageous in that the primary density gradient, the normal shock wave, is in the direction of beam propagation and thus results in a small laser beam distortion. Furthermore, the adjustability of the pressure at the aerodynamic window by simply moving the relative position of the conical nozzle is of advantage since minor adjustments will often have to be made to the design flow conditions.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. An apparatus for providing an aerodynamic window between regions of different pressure comprising:
   a convergent-divergent nozzle;
   support means positionable on a partition separating the regions of different pressure to enclose an opening in the partition, said support means supporting said nozzle in line with the opening;
   an open-ended conduit means positioned adjacent to and in line with the opening and extending toward said nozzle to provide a flow passage from the opening;
   flow control means to regulate fluid flow in said conduit means;

flow producing means coupled to said support means to produce a high-velocity fluid flow through said nozzle and said support means for producing a shock wave about the open end of said conduit means; and means for adjusting the stagnation pressure recovery across the shock wave to balance the pressure in the opening and in the conduit means.

2. The apparatus of claim 1 further comprising adjustment means to vary the axial distance between said nozzle and said conduit means.

3. The apparatus of claim 2 further comprising pressure sensors in said conduit means to measure the pressure on both sides of said flow control means.

4. The apparatus of claim 3 wherein said nozzle comprises an axisymmetric conical nozzle rotatably supported on said support means such that the centerline of said nozzle is coaxial with the centerline of the opening.

5. The apparatus of claim 4 wherein said adjustment means comprise screw threads on the exterior surface of said nozzle cooperating with screw threads on said support means to permit said nozzle to be rotatably adjusted relative to said support means.

6. The apparatus of claim 5 wherein said conduit means comprises a cylindrical tube having an inner diameter substantially equal to that of the opening, one end of said tube abutting the opening and the other end having a sharp, annular lip.

7. The apparatus of claim 6 wherein said flow control means comprises a wedge valve slidably positioned across the inner diameter of said cylindrical tube.

8. The apparatus of claim 7 further comprising a supersonic diffuser positioned on said support means adjacent to the exit of said conical nozzle.

9. An apparatus for providing an aerodynamic window for a laser device comprising, in combination:

a gasdynamic laser device having a lasing cavity;

an aperture in said laser device for the passage of a beam from said cavity;

an open-ended tubular extension positioned adjacent to and coaxial with said aperture;

a supersonic nozzle having its centerline positioned coaxially with said tubular extension and said aperture;

support means to rotatably support said nozzle;

flow inducing means to produce a supersonic flow in said nozzle for producing a shock wave about the open end of said tubular extension; and means for adjusting the stagnation pressure recovery to adjust pressure in said tubular extension to the cavity pressure.

10. The combination of claim 9 further comprising a valve slidably received in said tubular extension to control the passage of the laser beam.

11. The combination of claim 10 further comprising screw threads on the exterior surface of said nozzle cooperating with screw threads on said support means to permit adjustment of the axial position of the nozzle throat relative to the tubular extension.

12. The combination of claim 11 wherein said nozzle comprises an axisymmetric conical nozzle.

13. The combination of claim 12 further comprising a supersonic diffuser positioned adjacent to the exit of said conical nozzle.

* * * * *